(12) United States Patent
Buchanan et al.

(10) Patent No.: US 8,504,916 B2
(45) Date of Patent: Aug. 6, 2013

(54) MANAGING PRESENTATION AND STORING OF MULTI-LANGUAGE FONTS

(75) Inventors: Thomas P. Buchanan, Loveland, CO (US); Jeffery A. Engelman, Mead, CO (US); James M. Herold, Greeley, CO (US); David E. Stone, Longmont, CO (US)

(73) Assignee: Ricoh Production Print Solutions LLC, Boulder, CO (US)

( * ) Notice: Subject to any disclaimer, the term of this patent is extended or adjusted under 35 U.S.C. 154(b) by 958 days.

(21) Appl. No.: 11/777,695

(22) Filed: Jul. 13, 2007

(65) Prior Publication Data

US 2009/0015856 A1    Jan. 15, 2009

(51) Int. Cl.
*G06F 17/24* (2006.01)
(52) U.S. Cl.
USPC ........................................... 715/269; 358/1.1
(58) Field of Classification Search
USPC ................ 358/1.11; 715/269, 810.845, 810, 715/845
See application file for complete search history.

(56) References Cited

U.S. PATENT DOCUMENTS

| | | | |
|---|---|---|---|
| 6,445,458 B1 | 9/2002 | Focazio et al. | |
| 6,504,545 B1 * | 1/2003 | Browne et al. | 345/473 |
| 6,825,941 B1 | 11/2004 | Nguyen et al. | |
| 6,882,344 B1 * | 4/2005 | Hayes et al. | 345/467 |
| 7,079,264 B2 | 7/2006 | Nguyen et al. | |
| 2002/0093683 A1 | 7/2002 | Focazio et al. | |
| 2004/0257591 A1 | 12/2004 | Engelman et al. | |

OTHER PUBLICATIONS

MS Word 2003.*
Seethalakshmi, R., et al.; *Optical Character Recognition for Printed Tamil Text Using Unicode*; Journal of Zhejiang University Science; 2005; pp. 1297-1305.
Hardy, M., et al.; *Creating Structured PDF Files Using XML Templates*; Proceedings: DocEng '04; Asscoiation for Computing Machinery; 2004; pp. 99-108.
Smith, A.; *Experiences of A+ Under Windows*; APL'2002 Madrid Proceedings; 2002.

* cited by examiner

*Primary Examiner* — Eric A Rust
(74) *Attorney, Agent, or Firm* — Duft Bornsen & Fettig, LLP

(57) ABSTRACT

Methods and structures for improved font management providing for selection of one or more subsets of a selected typeface font in a font management program. A user is presented with information identifying one or more subsets of related code points in a selected typeface in a font management program. By selecting one or more subsets from the presented information, the user may reduce wasted presentation or management of code points in the typeface that are not presently of interest to the user. For example, when managing a Unicode typeface, a user may be prompted to select one or more language subsets prior to printing/displaying a matrix of the glyphs of the selected typeface. The presentation of glyphs or other code point information may then be limited to only the selected one or more subsets.

12 Claims, 6 Drawing Sheets

| | 059 | 05A | 05B | 05C | 05D | 05E | 05F |
|---|---|---|---|---|---|---|---|
| 0 | ▨ | | ׁ<br>05B0 | ׀<br>05C0 | א<br>05D0 | נ<br>05E0 | װ<br>05F0 |
| 1 | | | ׅ<br>05B1 | ׁ<br>05C1 | ב<br>05D1 | ס<br>05E1 | ױ<br>05F1 |
| 2 | | | ׂ<br>05B2 | ׂ<br>05C2 | ג<br>05D2 | ע<br>05E2 | ײ<br>05F2 |
| 3 | | | ׃<br>05B3 | ׃<br>05C3 | ד<br>05D3 | ף<br>05E3 | ׳<br>05F3 |
| 4 | | | ׄ<br>05B4 | | ה<br>05D4 | פ<br>05E4 | ״<br>05F4 |
| 5 | | | ֵ<br>05B5 | | ו<br>05D5 | ץ<br>05E5 | ▨ |
| 6 | | | ֶ<br>05B6 | | ז<br>05D6 | צ<br>05E6 | ▨ |
| 7 | | | ַ<br>05B7 | | ח<br>05D7 | ק<br>05E7 | ▨ |
| 8 | | | ָ<br>05B8 | ▨ | ט<br>05D8 | ר<br>05E8 | ▨ |
| 9 | | | ֹ<br>05B9 | ▨ | י<br>05D9 | ש<br>05E9 | ▨ |
| A | | | ֺ<br>05BA | ▨ | ך<br>05DA | ת<br>05EA | ▨ |
| B | | | ֻ<br>05BB | ▨ | כ<br>05DB | ▨ | ▨ |
| C | | | ּ<br>05BC | ▨ | ל<br>05DC | ▨ | ▨ |
| D | | | ֽ<br>05BD | ▨ | ם<br>05DD | ▨ | ▨ |
| E | | | ־<br>05BE | ▨ | מ<br>05DE | ▨ | ▨ |
| F | | | ֿ<br>05BF | ▨ | ן<br>05DF | ▨ | ▨ |

FIG. 7

MANAGING PRESENTATION AND STORING OF MULTI-LANGUAGE FONTS

BACKGROUND

1. Field of the Invention

The invention relates generally to management of fonts used for presentation of information to computer users and more specifically relates to management of typefaces containing multiple subsets of code points such as Unicode fonts containing multiple language subsets within the typeface.

2. Discussion of Related Art

Printing systems and other presentation devices such as user displays present both text and image information to users. When presenting text information, the text is typically represented or depicted by glyphs or images (e.g., graphical symbols or icons) representing individual characters (code points) within a collection of related glyphs referred to as the font typeface.

Often users utilize a font management program to manage large collections of fonts such as may be used in a production printing environment. A font management program may be used to modify or customize particular glyphs, characters, or code points within the font typeface. For example, customized glyphs may be defined for a particular printing or display application or enterprise (e.g., a corporate logo or other standardized corporate symbols and glyphs). Or, for example, standard glyphs for particular code points may be customized for a particular printing or display application. Exemplary of a well known, typical font management program is the FontLab Studio program. Another well known exemplary program is the Font Installer for AFP (Advanced Function Presentation) Systems from IBM. Other well-known, commercially available font management programs may be utilized for essentially similar purposes.

Presently known font management applications are generally operable to present to a user all glyphs (or other code point information) of a particular typeface for review by a user (e.g., presenting on the user's display screen and/or printing all of the glyphs of a selected font typeface). Where the font typeface contains a relatively small number of code points, presentation to the user of the entire collection of glyphs or other code point information of the font typeface is acceptable. However, where a font typeface contains a large number of code points such as the multiple languages encoded within a single Unicode font typeface, presentation to the user of all the glyphs or other code point information of the large font typeface may be impractical or unusable due to the volume of information (glyphs or other code point information) presented. The user may be required to scroll through hundreds or even thousands of display screens or pages of printed output to review particular glyphs or other information for particular code points of interest. For example, as noted, a typical Unicode font typeface may include many languages all encoded within a single Unicode font typeface. A typical font management programs such as FontLab Studio provides only the ability to print all of the glyphs of the code points of the Unicode font typeface thus forcing the user to review hundreds if not thousands of glyph images that may be irrelevant to a particular application of the Unicode font typeface.

It is evident from the above discussion that a need exists for improved font management methods and structures to permit presentation of manageable subsets of a large font typeface in a font management application program.

SUMMARY

The present invention solves the above and other problems, thereby advancing the state of useful arts, by providing methods and associated structures for presenting selected subsets of a font typeface to a user of the font management application. For example, where the font typeface is a Unicode font typeface containing multiple language subsets within the single font typeface, user interfacing in accordance with the features and aspects hereof may allow a user to select one or more of the multiple language subsets of the Unicode font typeface for presentation on the user's display and/or a printer associated with the user.

In one aspect hereof, a method is provided for managing a font typeface. The method includes presenting information to a user identifying one or more subsets of code points available in the font typeface. The method then receives user input identifying one or more selected subsets of the subsets to be presented to the user and presents code point information to the user wherein the code point information relates to code points of the one or more selected subsets.

Another aspect provides a method for presenting Unicode fonts in a font management program. The method includes presenting information to a user on a graphical user interface (GUI), the information indicating one or more language subsets available in the Unicode font. The method then receives user input from the GUI identifying one or more selected language subsets to be presented and presents glyphs corresponding to code points of the one or more selected language subsets of the Unicode font.

DETAILED DESCRIPTION OF THE DRAWINGS

FIGS. 1 through 7 and the following description depict specific exemplary embodiments of the present invention to teach those skilled in the art how to make and use the invention. For the purpose of this teaching, some conventional aspects of the invention have been simplified or omitted. Those skilled in the art will appreciate variations from these embodiments that fall within the scope of the present invention. Those skilled in the art will appreciate that the features described below can be combined in various ways to form multiple variations of the present invention. As a result, the invention is not limited to the specific embodiments described below, but only by the claims and their equivalents.

Figure 1:
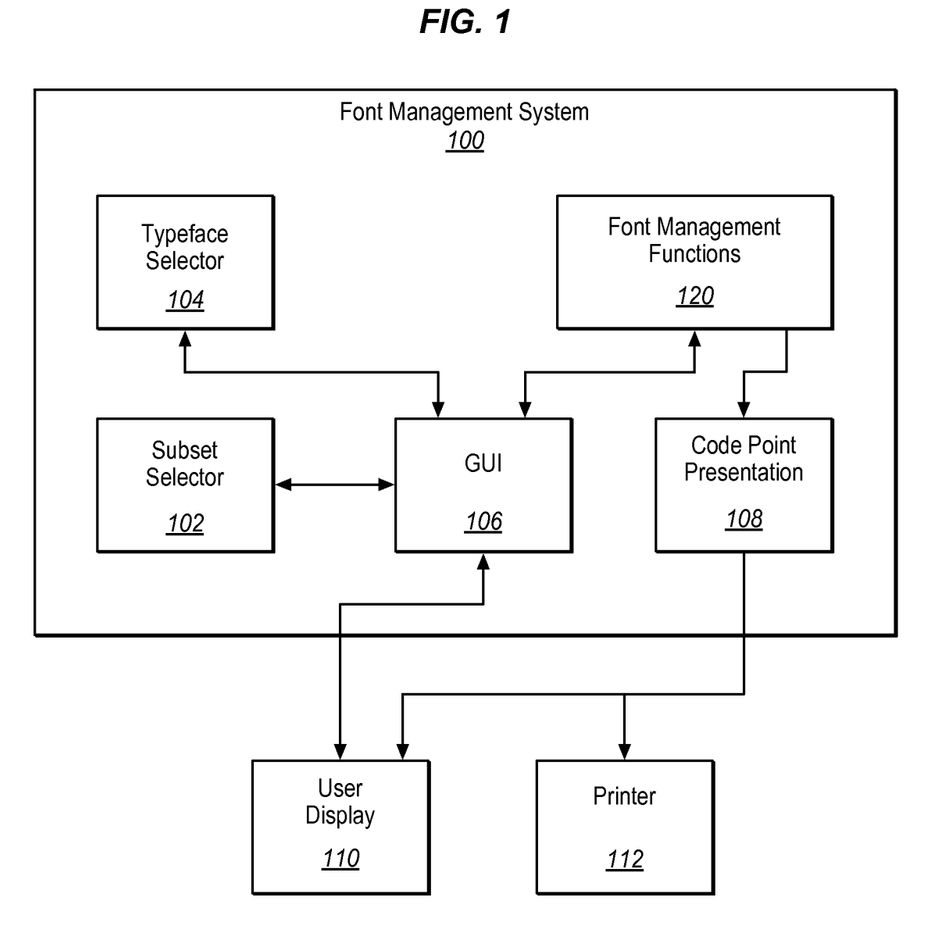
FIG. 1 is a block diagram of an exemplary font management system enhanced in accordance with features and aspects hereof to enable user selection of one or more subsets of a selected typeface for use in further management functions of the system.

FIG. 1 is a block diagram of a font management system 100 enhanced in accordance with features and aspects hereof to provide selection of one or more subsets of code points from a selected font typeface for presentation to a user of the font management system 100. As noted above, font management systems are generally utilized in a print enterprise to customize fonts for presentation on printers and/or user displays of various types. Customizations may include modification of individual glyphs or images corresponding to code points within a font typeface as well as addition or deletion of glyphs/images for particular code points as required for particular print enterprise applications. For example, customized characters or logos may be defined through font management system 100 added to appropriate typeface fonts for use in the printing or displaying of user data.

In general, font management system 100 may include font management functions 120 representing common management operations within typical font management systems. Typical management functions include adding, deleting, viewing, or modifying glyphs for particular code points of a font as well as adding, deleting, or modifying attribute and properties (such as metrics) of particular code points. Also functions to present information regarding the entire font typeface are common in management functions 120 of typical, commercially available font management programs such as FontLab Studio and the IBM Font Installer for AFP Systems.

Font management system 100 may include graphical user interface (GUI) 106 used for presenting standardized graphical user interface information to a user through user display 110 and any desired, appropriate input devices (not shown—e.g., keyboard, mouse, touch screen, tablet, digitizers, pointer devices, etc.). Using GUI 106, typeface selector 104 may interact with the user through user display 110 (and appropriate input devices) to select one or more typefaces to be managed utilizing font management functions 120. Especially in large print enterprises, a large variety of typeface fonts may be available and may require customization for the particular print enterprise applications. Thus, typeface selector 104 selects one or more of the available typeface fonts on which management functions 120 are to operate.

In accordance with features and aspects hereof, font management system 100 also includes subset selector 102 operable in conjunction with GUI 106 and user display 110 to receive user input selecting one or more subsets of code points from within the selected typeface font. As is generally known in the art, some font typefaces, in particular Unicode typefaces include a variety of subsets of related code points. For example, in the case of a Unicode typeface, some or all of the numerous languages defined within the Unicode standard may be at the present within any selected Unicode typeface. For example, a selected Unicode typeface may include the Unicode "Basic Latin" language subset, the "Latin 1 Supplement" language subset, the "Greek" language subset, the "Cyrillic" language subset, etc. Thus subset selector element 102 is operable to present to the user (through GUI 106 and display 110) all subsets known to be present within the selected font typeface. Subset selector element 102 then receives user input through appropriate input devices (not shown—e.g., associated with user display 110 and through GUI 106) to identify the particular selected one or more subsets desired for further management processing. For example, in the context of a Unicode typeface with multiple Unicode language subsets defined in the selected font typeface, subset selector element 102 may receive user input selecting the "Basic Latin" language subset and the "Latin 1 Supplement" language subset for further management processing.

One common management function performed by font management functions 120 is the presentation of code point information associated with the code points of a selected font typeface. Thus, subset selector 102 in conjunction with font management functions 120 may identify one or more selected subsets of the selected typeface for which the user desires to present code point information. Such code point information is presented by code point presentation element 108 under the direction of font management functions 120. Code point presentation element 108 may present the code point information for the selected one or more subsets of the selected typeface fonts on a user display 110, on a printer 112, or on any other suitable output device. The particular code point information to be displayed may include, for example, the glyph/image to be presented for each corresponding code point of the selected subsets. In addition or in the alternative, the code point information may include other desired information, properties, or attributes regarding each code point of the selected subsets of the selected font typefaces. For example, in certain print enterprise systems such as IBM's AFP, multiple font typefaces may be selected as a linked set of typefaces. Such a linked set defines a hierarchy of the linked fonts in that the first selected font of the linked set is the first potential source for a glyph or image to be associated with the code point value. If no glyph/image is defined in the first font of the set of linked fonts the second font of the set may be inspected to locate a suitable glyph/image for an identified code point and so forth through subsequent lower level fonts of the set of linked fonts. Thus the code point information presented by code point presentation element 108 may also include indicia of the font source from which a code point is presented in the AFP context of a set of linked fonts. The font source information may identify the particular font typeface from which the code point is presented as well as the hierarchical position of the font source within the linked set of typefaces.

Those of ordinary skill in the art will record readily recognize numerous additional and equivalent elements within a fully functional font management system. Such additional elements are well known to those of ordinary skill in the art and all needed herein simply for brevity of this discussion. Thus font management system 100 of FIG. 1 is intended merely as exemplary of one possible embodiment of the font management system 100 enhanced in accordance with features and aspects hereof.

Figure 2:
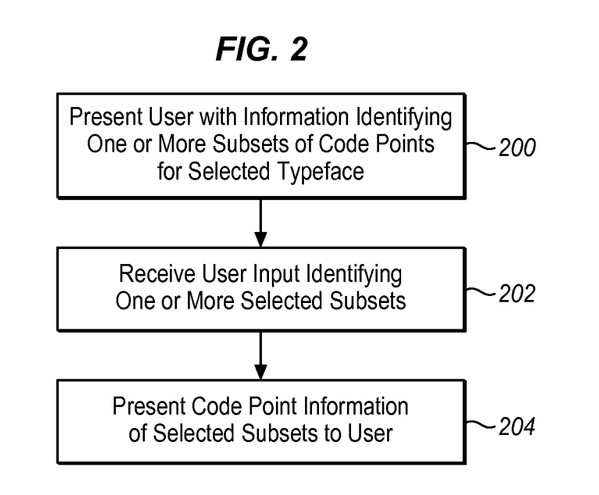
FIGS. 2, 3, and 4 are flowcharts of exemplary methods in accordance with features and aspects hereof to enable a user of a font management program to select one or more subsets of a selected typeface or linked set of typefaces for further management functions.

FIG. 2 is a flowchart describing an exemplary method in accordance with features and aspects hereof to present code point information to a user of a font management system from one or more selected subsets of a selected typeface. Element 200 is first operable to present a user of the system with information identifying one or more subsets of code points defined within a currently selected typeface. As noted above, a single typeface font such as a Unicode typeface may include one or more subsets of related code points such as language subsets. Thus element 200 may present information to the user (e.g., on a user display) indicating the available subsets in the presently selected typeface. Element 202 is then operable to receive the user input (e.g., through an appropriate user input device) identifying one or more selected subsets to be used for further management purposes. For example, in the case of a Unicode typeface, one or more language subsets may be selected as indicated by the received user input. Element 204 is then operable to present code point information for each code point in the one or more selected subsets of the presently selected typeface. As noted above, code point information so presented may include the glyph/image data corresponding to each code point of the selected subsets and/or may include other code point attributes and property information.

Figure 3:
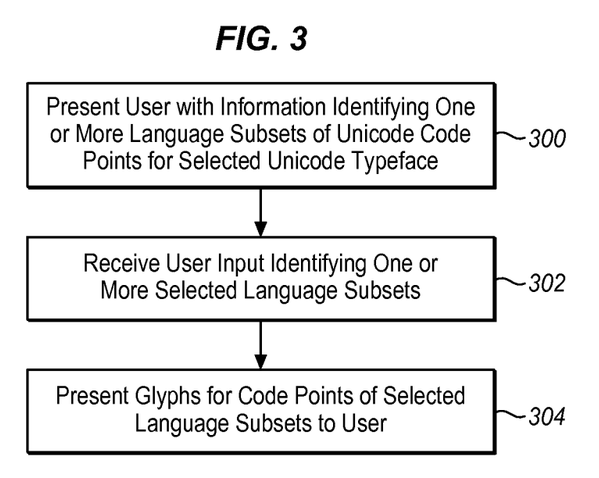

FIG. 3 is a flowchart describing another exemplary method in accordance with features and aspects hereof similar to that presented above with respect to FIG. 2. FIG. 3 is a similar method but focused on the particular processing associated with management of a Unicode typeface font. Element 300 is therefore operable to present the user with information identifying one or more language subsets of a presently selected Unicode typeface. Exemplary of such language subsets defined by the Unicode specifications are: Basic Latin, Greek, Cyrillic, Hebrew, Arabic, etc. Element 302 is then operable to receive user input as discussed above with respect to FIG. 2 from an appropriate user input device. The user input identifies one or more selected language subsets selected for further management processing. Element 304 is then operable to present glyphs and/or other code point information for the code points of the selected one or more language subsets.

Figure 4:
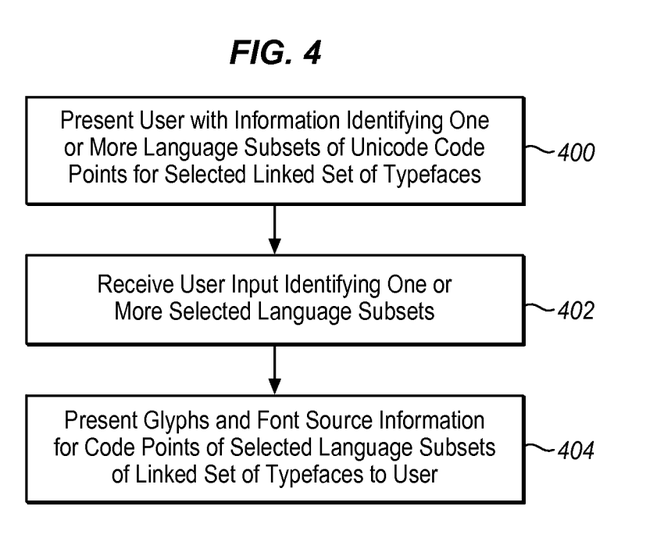

FIG. 4 is yet another exemplary flowchart representing an exemplary method in accordance with features and aspects hereof similar to that presented above with respect to FIGS. 2 and 3. The flowchart of FIG. 4 describes a similar method useful for presenting code point information for a selected linked set of typefaces. As noted above, in some presentation environments such as the IBM AFP environment, multiple typefaces may be linked as a set of hierarchically related typefaces. For each code point, an appropriate glyph may be located within the first typeface of the hierarchically linked set. If no glyph is defined in the first typeface of the hierarchically linked set, the second typeface hierarchically linked in the set is inspected to locate a glyph for a given code point. As well known in the AFP architecture, such a hierarchical approach to locating an appropriate glyph for an identified code point may proceed through subsequent hierarchically deeper typefaces in the linked set of typefaces.

Element 400 is therefore operable to present the user with information identifying one or more language subsets available within the selected linked set of typefaces. Element 402 then receives user input from any appropriate user input device identifying one or more selected language subsets of the presently selected Unicode linked set of typefaces. Lastly, element 404 is operable to present glyphs and/or other code point information for the code points of the selected language subsets of the presently selected linked set of typefaces. Such other information for each code point may include, for example, information identifying the particular font or typeface source of the hierarchically linked set of typefaces from which each element of code point information is presented. In other words, for each glyph or other code point information presented, font source information identifying the particular typeface font of the set of linked typefaces may be presented to indicate which of the linked typefaces supplied the presented glyph and/or other code point information.

Those of ordinary skill in the art will readily recognize numerous additional and equivalent method steps to those presented in the methods of FIGS. 2 through 4. Such additional method steps are generally known to those of ordinary skill in the art in a fully functional font management system and are eliminated herein merely for brevity of this discussion. Therefore, FIGS. 2 through 4 are intended merely as representative of exemplary embodiments of methods in accordance with features and aspects hereof to permit selection of one or more subsets of the presently selected typeface fonts for use in management functions of the font management system and in particular for use in presentation of glyphs and other code point information for code points of the selected subsets.

Figure 5:
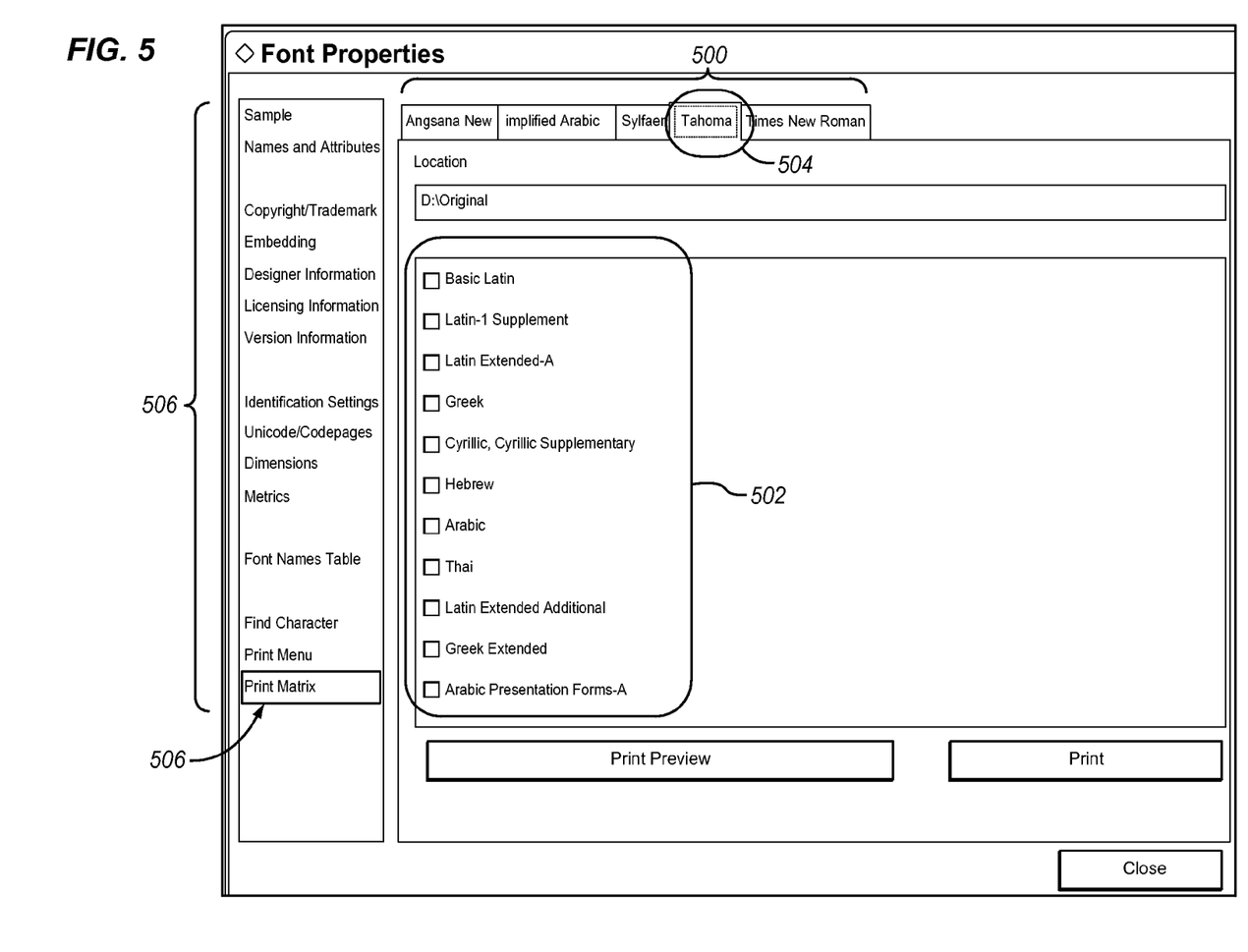
FIG. 5 is an exemplary display screen presented to a user of a font management system in accordance with features and aspects hereof to permit a user to select one or more subsets of one or more selected typefaces for further management processing by the font management system.

FIG. 5 is an exemplary display screen image useful to present a user of the font management system with information identifying one or more subsets of a presently selected typeface (or presently selected linked set of typefaces). By way of example, tabs 500 on the upper portion of the display screen may identify available typeface fonts that may be selected by the user of the font management system. Subset check boxes 502 (and encircled for highlighting) identify one or more subsets of the currently selected typeface that may be selected by the user for further management functions such as presentation of glyphs or other code point information. In particular, for example, where the available typeface presently selected is a Unicode typeface 504 (e.g., the Tahoma typeface highlighted by the circle as presently selected), the identified subsets may represent language subsets within the Tahoma Unicode typeface. Thus, subset check boxes 502 may identify one or more language subsets within the currently selected Tahoma Unicode typeface. Menu items 506 on the left side of the exemplary screen display may be selected to perform desired operations on one or more subsets of a typeface. Those of ordinary skill in the art will readily recognize that the operations of menu items (506) may be selected first followed then by selection of a typeface (504) and selection of one or more subsets (502). Or, conversely, one or more subsets (502) of a selected typeface (504) may be first selected followed by selection of an action or function to be performed from the menu items (506). For example, the "Print Matrix" function highlighted as element 508 and may be selected by a user to cause the printing or display of a matrix of the glyph images or other code point information for each code point defined in the presently selected one or more subsets of the presently selected typeface. By allowing the user to select particular subsets of the selected typeface, the print matrix function may be restrained to print only selected code points corresponding to the selected subsets thereby simplifying management functions for the user by focusing only on relevant code points for the particular management function desired.

Figure 6:
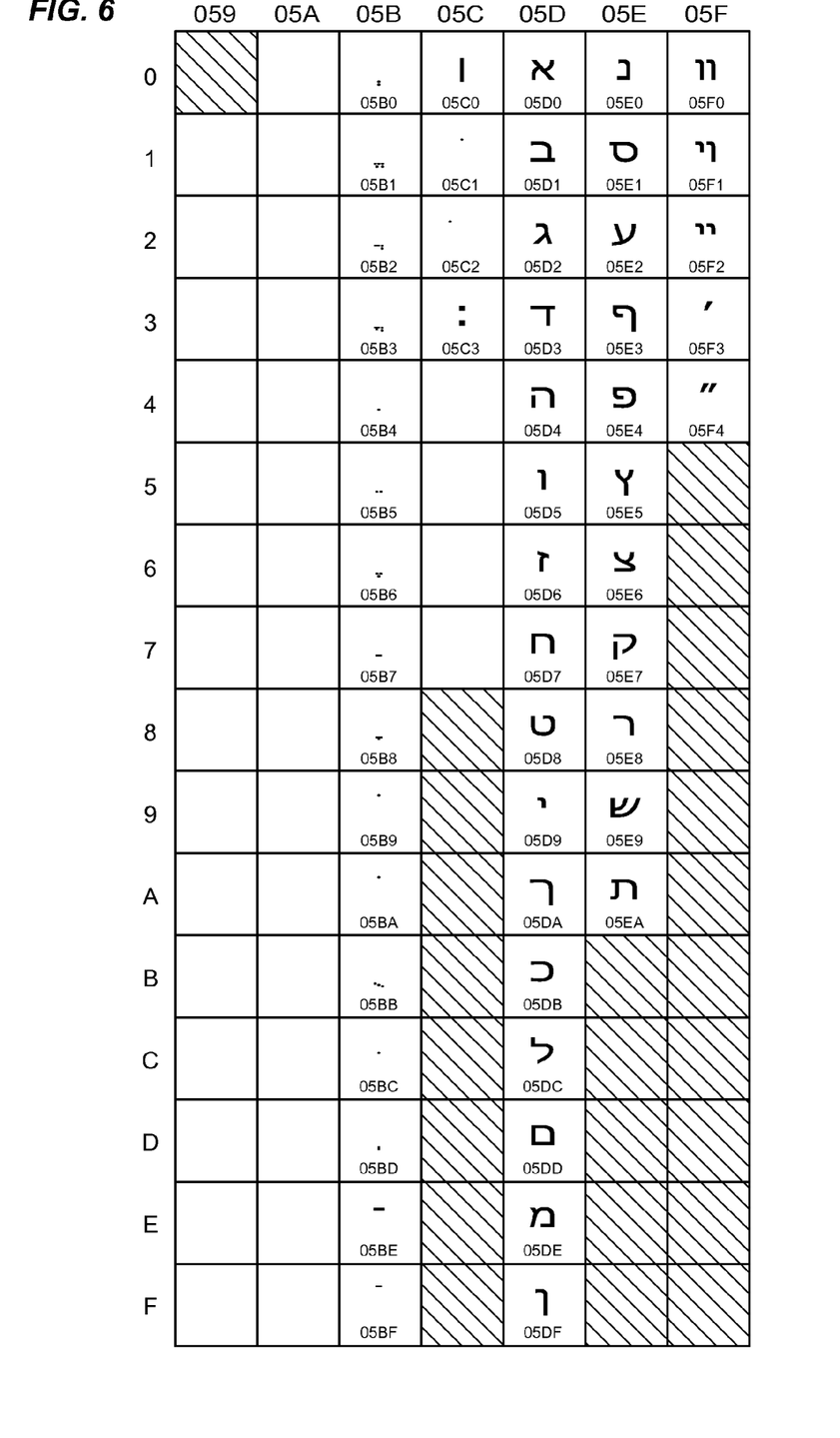
FIG. 6 is an exemplary presentation of code point information for a selected subset of a selected typeface in a font management system in accordance with features and aspects hereof.

FIG. 6 is an exemplary image of a printed font matrix for code points defined in an exemplary currently selected subset of an exemplary presently selected typeface. Only those code points defined within the selected subsets will be displayed or printed (e.g., presented) by the print matrix font management function noted above with respect to FIG. 5. Thus, the user may more precisely focus the Print Matrix management function on the most relevant code points relating only to the selected subsets. The user need not "wade" through hundreds or thousands of printed sheets or display screens to view and manage particular code points of a selected typeface. Rather, only relevant subsets are presented to the user. As noted, these features and aspects may be particularly useful in management of Unicode typefaces where many languages are all encoded as code points in the Unicode typeface. As shown in FIG. 6 a "Hebrew" subset of the Tahoma Unicode typeface was selected for presentation. Only code points 0x590 through 0x5ff (the Hebrew subset of the Unicode typeface) are presented to the user for further management and viewing (on a user display or printed for further viewing). Some code points of the Hebrew subset of the Tahoma Unicode typeface are defined as part of the subset but there is no glyph presently loaded or defined for that code point. These code points may be presented to the user as blank boxes (e.g., code points 0x591 through 0x5af). Other code points are defined as reserved in the Hebrew subset of the Tahoma Unicode typeface and thus there should not be a glyph associated with these code points. These other code points may be presented to the user as cross-hatched or other visible indicia to indicate their reserved status (e.g., code points 0x5c8 through 0x5cf). Those of ordinary skill in the art will recognize numerous equivalent visual indicia to represent code points in the selected subset(s) of a selected typeface including those with glyphs presently defined and code point with no glyph presently defined. Thus FIG. 6 is intended merely as representative of one possible embodiment of such a visual presentation of a selected subset of code points.

Figure 7:
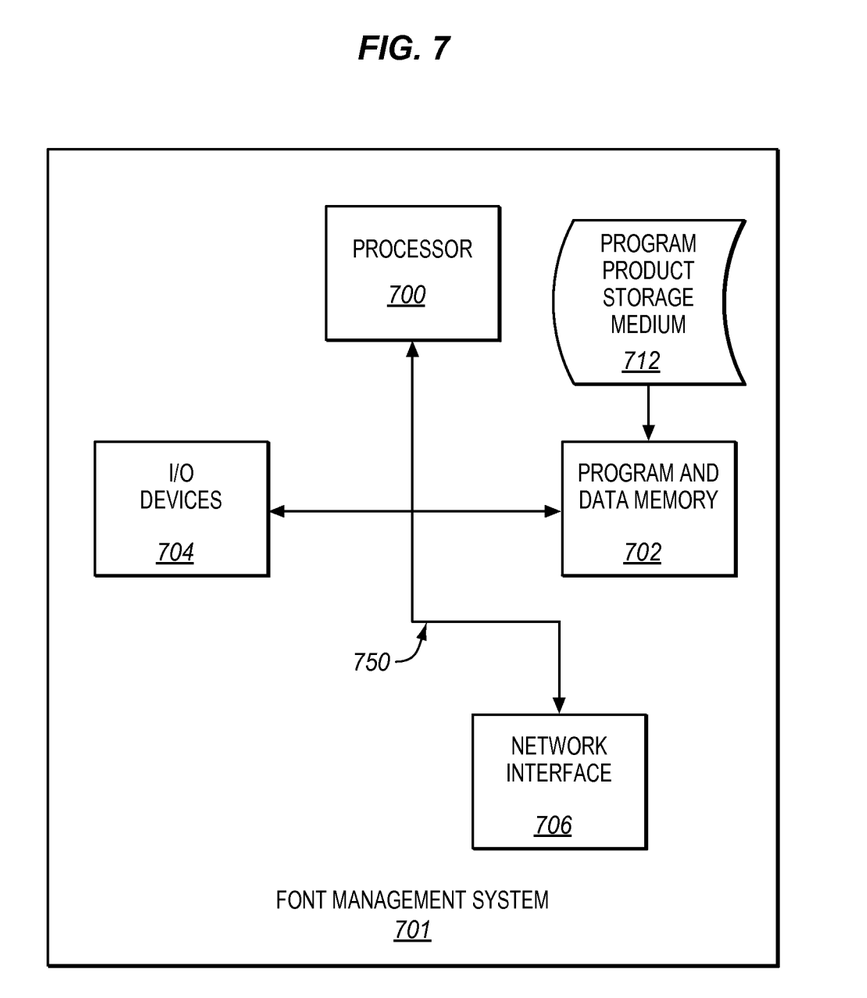
FIG. 7 is a block diagram of an exemplary font management system that may provide enhanced font management features and aspects hereof, the system including bulk storage of a program product that may embody methods and processes hereof.

Embodiments of the invention can take the form of an entirely hardware embodiment, an entirely software embodiment or an embodiment containing both hardware and software elements. In a preferred embodiment, the invention is implemented in software, which includes but is not limited to firmware, resident software, microcode, etc. FIG. 7 is a block diagram depicting a font management system 701 as a data processing device adapted to provide features and aspects hereof by executing programmed instructions and accessing data stored on a computer readable storage medium 712.

Furthermore, the invention can take the form of a computer program product accessible from a computer-usable or computer readable medium 712 providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor 700 coupled directly or indirectly to memory elements 702 through a system bus 750. The memory elements can include local memory employed during actual execution of the program code, bulk storage, and cache memories which provide temporary storage of at least some program code in order to reduce the number of times code must be retrieved from bulk storage during execution.

Input/output or I/O devices 704 (including but not limited to keyboards, displays, pointing devices, etc.) can be coupled to the system either directly or through intervening I/O controllers. Network adapter interfaces 706 may also be coupled to the system to enable the data processing system to become coupled to other data processing systems or storage devices through intervening private or public networks. Modems, cable modems, IBM Channel attachments, SCSI, Fibre Channel, and Ethernet cards are just a few of the currently available types of network or host interface adapters.

Although specific embodiments were described herein, the scope of the invention is not limited to those specific embodiments. The scope of the invention is defined by the following claims and any equivalents thereof.

What is claimed is:

1. A method for managing Unicode fonts in a font management program, the method comprising:
   receiving user input from a graphical user interface (GUI) selecting a Unicode typeface comprising multiple glyphs that are each associated with a different Unicode code point;
   presenting information that identifies a plurality of language subsets available in the Unicode typeface to a user via the GUI;
   receiving user input from the GUI identifying one or more selected language subsets to be presented from the plurality of language subsets, wherein the selected subsets comprise less than an entirety of the Unicode typeface;
   presenting glyphs corresponding only to code points of the one or more selected language subsets of the Unicode typeface via the GUI;
   receiving user input requesting a modification to a presented glyph of the Unicode typeface; and
   altering image data for the presented glyph as it is stored in the Unicode typeface responsive to receiving the user input, so that each time the code point is referenced in a document utilizing the Unicode typeface, the modified glyph will be used instead of the presented glyph.

2. The method of claim 1
   wherein the Unicode typeface comprises a set of linked fonts,
   wherein the step of presenting information further comprises:
      presenting information indicating a plurality of language subsets available in the set of linked fonts.

3. The method of claim 2 wherein the step of presenting glyphs further comprises:
   presenting glyphs of the one or more selected language subsets of the set of linked fonts wherein the presentation includes indicia of a particular font of the set of linked fonts from which each code point of the one or more selected language subsets is presented.

4. The method of claim 1 wherein
   the presented glyphs comprise all of the glyphs of the selected subsets, and all of the presented glyphs are rendered at the GUI at the same time.

5. The method of claim 1 wherein the step of presenting glyphs further comprises:
   presenting glyphs corresponding only to each of the code points of the one or more selected language subsets of the Unicode typeface.

6. The method of claim 1 wherein the selected language subsets comprise at least two subsets.

7. A computer program product comprising a non-transitory computer readable medium embodying a computer readable program, wherein the computer readable program when executed on a computer causes the computer to perform the steps of:
   receiving user input from a graphical user interface (GUI) selecting a Unicode font typeface comprising multiple glyphs that are each associated with a different Unicode code point;
   presenting information that identifies a plurality of language subsets available in the Unicode typeface to a user via the GUI;
   receiving user input from the GUI identifying one or more selected language subsets to be presented from the plurality of language subsets, wherein the selected subsets comprise less than an entirety of the Unicode typeface;
   presenting glyphs corresponding only to code points of the one or more selected language subsets of the Unicode typeface;
   receiving user input requesting a modification to a presented glyph of the Unicode typeface; and altering image data for the presented glyph as it is stored in the Unicode typeface responsive to receiving the user input, so that each time the code point is referenced in a document utilizing the Unicode typeface, the modified glyph will be used instead of the presented glyph.

8. The program product of claim 7
wherein the Unicode typeface comprises a set of linked fonts,
wherein the step of presenting information further comprises:
presenting information indicating a plurality of language subsets available in the set of linked fonts.

9. The program product of claim 8 wherein the step of presenting glyphs further comprises:
presenting glyphs of the one or more selected language subsets of the set of linked fonts wherein the presentation includes indicia of a particular font of the set of linked fonts from which each code point of the one or more selected language subsets is presented.

10. The program product of claim 7 wherein
the presented glyphs comprise all of the glyphs of the selected subsets, and all of the presented glyphs are rendered at the GUI at the same time.

11. The program product of claim 7 wherein the step of presenting glyphs further comprises:
presenting glyphs corresponding only to each of the code points of the one or more selected language subsets of the Unicode typeface.

12. The program product of claim 7 wherein the selected language subsets comprise at least two subsets.

* * * * *